(12) United States Patent
Dahanayake et al.

(10) Patent No.: US 7,629,296 B2
(45) Date of Patent: Dec. 8, 2009

(54) COMPOSITION AND METHOD FOR THICKENING HEAVY AQUEOUS BRINES WITH CATIONIC GUAR

(75) Inventors: Manilal S. Dahanayake, Princeton Junction, NJ (US); Subramanian Kesavan, East Windsor, NJ (US); Allwyn Colaco, South River, NJ (US)

(73) Assignee: Rhodia Inc., Cranbury, NJ (US)

( * ) Notice: Subject to any disclaimer, the term of this patent is extended or adjusted under 35 U.S.C. 154(b) by 421 days.

(21) Appl. No.: 11/280,895

(22) Filed: Nov. 16, 2005

(65) Prior Publication Data

US 2007/0111897 A1 May 17, 2007

(51) Int. Cl.
*C08B 37/00* (2006.01)
*C09K 8/08* (2006.01)

(52) U.S. Cl. ............. 507/110; 507/129; 507/145; 507/212; 507/241; 507/277; 507/904

(58) Field of Classification Search ............. 507/110, 507/129, 145, 212, 241, 277, 904
See application file for complete search history.

(56) References Cited

U.S. PATENT DOCUMENTS

| | | | |
|---|---|---|---|
| 3,472,840 A | 10/1969 | Stone et al |
| 4,031,307 A | 6/1977 | DeMartino et al. |
| 4,392,964 A | 7/1983 | House et al. |
| 4,415,463 A | 11/1983 | Mosier et al. |
| 4,420,406 A | 12/1983 | House et al. |
| 4,435,564 A | 3/1984 | House |
| 4,439,333 A | 3/1984 | House et al. |
| 4,619,773 A | 10/1986 | Heilweil et al. |
| 4,663,159 A | 5/1987 | Brode, II et al. |
| 5,037,930 A | 8/1991 | Shih |
| 5,176,901 A * | 1/1993 | Gallopo et al. ............. 424/54 |
| 5,387,675 A | 2/1995 | Yeh |
| 5,473,059 A | 12/1995 | Yeh |
| 6,346,588 B1 | 2/2002 | Fenchl et al. |
| 6,855,671 B2 | 2/2005 | Norfleet et al. |
| 2002/0193343 A1 | 12/2002 | Khan et al. ............. 514/54 |

FOREIGN PATENT DOCUMENTS

| | | |
|---|---|---|
| CA | 2423096 A1 | 9/2003 |
| EP | 726302 B1 | 8/1996 |
| GB | 1499034 A | 1/1975 |
| WO | WO 97/26310 A1 | 7/1997 |
| WO | WO 98/21291 A1 | 5/1998 |

* cited by examiner

*Primary Examiner*—Timothy J. Kugel

(57) ABSTRACT

A process of preparing a well servicing fluid comprising viscosifying a heavy brine by contacting with a cationic polysaccharide and a composition thereof.

18 Claims, No Drawings

COMPOSITION AND METHOD FOR THICKENING HEAVY AQUEOUS BRINES WITH CATIONIC GUAR

BACKGROUND OF THE INVENTION

1. Field of the Invention

The present invention relates to compositions for use as thickening agents in heavy brine systems and to aqueous well servicing fluids prepared thereon. More specifically the invention relates to viscosifying heavy brine compositions with cationic polysaccharides.

2. Description of the Related Art

Thickened aqueous mediums, particularly those containing oil field brines, are commonly used as well servicing fluids such as drilling fluids, workover fluids, completion fluids, packer fluids, well treating fluids, subterranean formation treating fluids, fracturing fluids, spacer fluids, hole abandonment fluids, and other aqueous fluids in which an increase in viscosity is desired. Workover fluids are those fluids used during remedial work in a drilled well. Such remedial work includes removing tubing, replacing a pump, cleaning out sand or other deposits, logging, etc. Workover also broadly includes steps used in preparing an existing well for secondary or tertiary recovery such as polymer addition, micellar flooding, steam injection, etc. Fracturing fluids are used in oil recovery operations where subterranean is treated to create pathways for the formation fluids to be recovered.

Completion fluids are those fluids used during drilling, completion, or recompletion, of the well. Completion operation normally includes perforating the casing, setting the tubing and pumps in petroleum recovery operations. Both workover and completion fluids are used in part to control well pressure, to prevent the well from blowing out during completion or workover, or to prevent the collapse of well casing due to excessive pressure build-up.

Polymers and chemicals are added to the brines used in well servicing fluids for various reasons that include, but are not limited to, increasing viscosity, and increasing the density of the brine. For example, in order to obtain brine having a salinity of about 11.5 to 19.5 pounds per gallon (ppg), ionic salts of calcium, magnesium and zinc are often added to the brine. Water-thickening polymers serve to increase the viscosity of the brines and thus retards the migration of the brines into the formation and lifts drilled solids from the well-bore. Another advantage of using heavy brines is the ability to penetrate deeper in oil formations.

Polysaccharides such as hydroxyethyl cellulose (HEC), carboxylmethylhydroxyethyl cellulose, carboxymethyl cellulose (CMC) and synthetic polymers such as polyacrylamides (PAM) are commonly used to increase the viscosity of brines. These polymers are incapable of hydration and increasing the viscosity of heavy brines, particularly greater than 11.5 ppg. Further, viscosifying heavy brines presents problems due to incompatibility and/or precipitation of polysaccharides in the presence of dissolved multivalent salts. Use of high molecular weight synthetic polymers such as PAM provides relatively low viscosities. Moreover, when PAM emulsions are used, inverting surfactants are required, and these are usually added separately during operation involving additional process steps. Further, these polymers when used to viscosify brines that contain zinc ions in the range of 0.1 wt % to 7 wt % do not function effectively without the use of additives. As heavy brines containing high levels of zinc salts are widely used as workover fluids, drilling fluids, fracturing fluids and completion fluids in oil field operations, development of a process for viscosifying heavy brines is highly desirable.

Among the problems in using polysaccharides such as HEC in thickening is the formation of clumps referred to as "fish eyes" due to poor hydration that can cause clogging and formation damage. HEC and other polysaccharides surface-hydrate too rapidly and non-uniformly, resulting in clumps. Many of these polysaccharides hydrate only after elevating the temperature of the brine and when these are normally supplied dry powders require special preparation and/or mixing and dispersing equipment when added to brines. Further, exposure to higher down-hole temperatures that dissolve the clumps cause brine viscosities to fluctuate resulting in unpredictable and undesirable latent viscosities. Moreover, many of the polysaccharides also tend to form separate gummy polymer layers in high density brines, particularly in the range of densities of 11.5 to 19.5 ppg.

Various attempts have been made involving additional time and expense to overcome the dissolution problems described above. These include additional steps including treatment of the polysaccharides with additives in solvent media that increases the risk of flammability. For example, in U.S. Pat. No. 4,392,964 to R. House et. al., a polymer composition with organic solvents prepared by mixing 5-30 parts of HEC with at least 40 parts of isopropanol mixed with 3-40 parts water in order to thoroughly wet the HEC prior to addition to the brine. In U.S. Pat. No. 4,415,463 to B. Mosier et. al., natural polysaccharide gums such as carageenan and locust bean are treated with a basic nitrogen reagent to wet the polymer prior to addition to the brine. Such treatments required dry powders of the polysaccharide gums or solutions of isopropanol-water prior to contacting with alcohol and the basic nitrogen reagent to ensure wettability of the treated product. In U.S. Pat. Nos. 4,435,564 and 4,439,333 to R. House, HEC is first activated such that the HEC will disperse and hydrate in heavy brines. The activation process comprises admixing HEC in a solution of either an amino or phenolic compound and a water soluble organic liquid prior to brine addition. Some of these additives also become ineffective when added to brines having densities above about 12 ppg. In U.S. Pat. No. 4,420,406 to R. House et al. it was disclosed that heavy brine solutions having a narrow density range of 14.2 to 15.6 ppg could be effectively thickened with HEC depending on the presence or absence of calcium chloride and the specific amount of zinc bromide in the brine.

Synthetic polymers disclosed in U.S. Pat. No. 4,619,773 are thickened brines containing AMPS/vinylamide and optionally acrylamide. U.S. Pat. No. 6,346,588 to Franchel et. al., discloses terpolymers based on (meth)acrylamide, hydroxyalkyl (meth)acrylate and sulfobetaine monomers and their use as thickeners for aqueous salt solutions containing calcium chloride and/or calcium bromide and/or zinc bromide.

Given the above, it is desirable to have a natural polymer such as polysaccharide that viscosifies the heavy brines containing calcium, magnesium and zinc salts in well servicing fluids without the use of additives and/or additional treatment steps prior to mixing with the heavy brines. In particular, it is desirable to obtain a polysaccharide that viscosfies heavy brine particularly in the range of densities of 11.5 ppg to 19.5 ppg. In accordance with the present invention, there is provided a well servicing fluid composition and a process of preparation thereof comprising a heavy brine compositions containing calcium and zinc salts and a cationic polysaccharide for viscosifying the brine.

SUMMARY OF THE INVENTION

It is an object of the present invention to provide a method of preparing a well servicing fluid comprising viscosifying a brine by contacting the brine with a cationic polysaccharide.

It is a further object to provide a well serving fluid composition comprising a brine comprising a zinc salt, a calcium salt, and a cationic polysaccharide for viscosifying the brine.

It has been unexpectedly found that cationic polysaccharides viscosity brines containing zinc salts, calcium salts, and particularly heavy brines having densities from about 11.5 ppg to about 19.5 ppg.

Another object of the present invention is to provide a brine composition useful for workover, drilling and completion fluids. Other objects, features, and advantages will become more apparent as the invention is more fully disclosed hereinbelow.

DETAILED DESCRIPTION OF THE INVENTION

The present invention deals with increasing the viscosity of a brine containing a zinc compound by contacting a cationic polysaccharide with the brine so that the thus-viscosified brine can be used in workover, drilling, fracturing and completion fluids.

Heavy brines used in oil field operations have densities ranging from about 11.5 ppg to about 19.5 ppg. Preferred heavy brines have densities ranging from about 14 ppg to about 19.5 ppg. More preferably the heavy brine has a density from about 16 ppg to about 19.5 ppg.

Zinc salts are added to brines to increase the density and to prepare heavy brines having at least one water soluble salt of a multivalent metal. Examples of zinc salts used as an additive include, but are not limited to, zinc chloride, zinc bromide, zinc iodide, zinc sulfate, and mixtures thereof. The presently preferred zinc salts are zinc chloride and zinc bromide because of low cost and ready availability.

According to the present invention, the weight (wt)% of the zinc salts in the heavy brine can vary widely from about 1 wt % to about 55 wt % based on the weight of the brine, preferably zinc salts vary from about 10 wt % to about 50 wt %, more preferably from about 30 wt % to about 50 wt %. The brine can also contain a variety of monovalent, divalent and multivalent salts, and mixtures thereof. Examples of monovalent and divalent salts include but not limited to are sodium chloride, sodium bromide, potassium chloride, potassium bromide, calcium chloride, calcium bromide, and magnesium chloride, and mixtures thereof. Preferably calcium salts vary from about 1 wt % to about 55 wt % based on the weight of the brine, and more preferably from 10 wt % to about 55 wt %. Preferably the weight % of the total dissolved solids in the brine is in the range from about 10 wt % to about 80 wt %, more preferably from about 75 wt % to about 80 wt %.

Cationic polysaccharides for use in the invention include any naturally occurring cationic polysaccharide as well as polysaccharides and polysaccharide derivatives that have been cationized by chemical means, e.g. quaternization with various quaternary amine compounds containing reactive chloride or epoxide sites. Methods for preparation of the cationic polysaccharides are disclosed in U.S. Pat. Nos. 4,663,159; 5,037,930; 5,473,059; 5,387,675; 3,472,840 and 4,031,307, all of which are incorporated herein by reference. Cationic derivatives are obtained by reaction between the hydroxyl groups of the polysaccharide and reactive chlorides or epoxide sites. The degree of substitution of the cationic groups onto the guar structure must be sufficient to provide the requisite cationic charge density. Examples of such cationized polysaccharides include, but are not restricted to polysaccharides and polysaccharide derivatives selected from the group consisting of guar, hydroxyalkyl guar, carboxyalkyl guar, carboxyalkyl hydroxyalkyl guar, hydrophobically modified guar, hydrophobically modified hydroxyalkyl guar, hydrophobically modified carboxyalkyl guar, hydrophobically modified carboxyalkyl hydroxyalkyl guar, pectin, alginates, locust bean gum, gum arabic, gum ghatti, gum acacia, carrageenan, hydroxyalkyl cellulose, carboxyalkyl hydroxyalkyl cellulose, carboxyalkyl cellulose, alkyl ethers of cellulose, hydroxyalkyl methyl cellulose, hydrophobically modified hydroxyalkyl cellulose, hydrophobically modified carboxyalkyl hydroxyalkyl cellulose, hydrophobically modified carboxyalkyl cellulose, hydrophobically modified alkyl ethers of cellulose, hydrophobically modified hydroxyalkyl methyl cellulose, starch, gum tragacanth, gum karaya, tara gum, tamarind gum, xanthan gum, welan gum, and succinoglucans, and mixtures thereof.

Preferred cationic polysaccharides are cationic guars and cationic hydroxy alkyl guars such as cationic hydroxy propyl guar and cationic hydroxy ethyl guar that are derived from naturally renewable resources, and these environmentally acceptable compared to synthetic polymers. Example of cationic guar gum is a hydroxypropyl trimethylammonium chloride guar derivative prepared by the reaction of guar gum with N-(3-chloro-2-hydroxypropyl) trimethylammonium chloride. Ratio of the hydroxypropyl trimethyl ammonium chloride moiety to guar gum saccharide unit can be 0.03 to 0.3, but preferably 0.07 to 0.15. More preferably, the cationic guar polymer is guar hydroxypropyltrimethylammonium chloride. Specific non-limiting examples of cationic guar polymers include: Jaguar® C 13S, having a cationic charge density of about 0.8 meq/g (available from Rhodia Company) and Jaguar® C 17, having a cationic charge density of about 1.6 meq/g (available from Rhodia Company).

Further, cationic guars that facilitate easier recovery of the polymers compared to PAM once the operation is completed in well servicing fluids are preferred. Most preferred are the cationic guars that have lower tendency to adsorb or precipitate in subterranean formations minimizing long term damage to the formations. The average molecular weight of cationic guars suitable for use herein is preferably from about 100,000 to about 2,000,000, more preferably from about 100,000 to about 1,000,000, and most preferably from about 300,000 to about 1,00,000.

Further enhancement of brine viscosity and of the well servicing fluids may be obtained by treating cationic polysaccharide containing polymer solutions with cross-linking agents, typically selected from titanium, aluminum, boron and zirconium based compounds, or mixtures thereof. Most typically, boron and zirconium based additives are employed. Boron cross-linkers are typically used with cationic polysaccharides prepared from polysaccharides such as guar gum and its derivatives, including hydroxypropyl guar (HPG), carboxymethyl guar (CMG) and carboxymethylhydroxypropyl guar (CMHPG). Most typically, boron crosslinkers are employed with cationic guar because it offers suitable performance at lower cost. Zirconium-based additives may be mixed with cationically modified carboxymethylated guar derivatives such as CMG or CMHPG to form stable gels. Other suitable cationic guar derivatives include cationically modified alkylated carboxylated polymers such as methyl and ethyl carboxymethyl guar and cationic hydroxypropylguar.

Any anionic counterions may be use in association with the cationic guars so long as the cationic guars remain soluble in the brine, and so long as the counterions are physically and chemically compatible with zinc compounds and do not otherwise unduly impair performance and stability. Non-limiting examples of such counterions include: halides (e.g., chloride, fluoride, bromide, iodide), sulfate, methylsulfate, and mixtures thereof.

According to the present invention, any suitable means such as, for example, mixing with a typical oil field drilling fluid mixing equipment, can be used for the contacting of the cationic polysaccharide to viscosify the brines. Such contacting of the cationic polysaccharide can be in the presence or absence of a surfactant. The viscosified brines now having a desired viscosity can be used as well servicing fluids in oil field operations by those skilled in the art. Generally, the well servicing fluids comprising the viscosified brines can be used in any drilled wells having a temperature in the range from about 80° F. to about 300° F. Such well servicing fluids have viscosities preferably from about 200 cps to about 15000 cps, more preferably from about 200 cps to about 5000 cps.

Example described hereinbelow is intended to further illustrate the present invention and should not be construed as more limiting than the appended claims.

EXAMPLE

This example illustrates that cationic polysaccharides such as cationic guar gum is used to increase the viscosity of brines containing calcium salts and zinc salts.

Cationic guars shown in Tables 1, 2 and 3 were added to 200 g of brine to reach the final polymer concentration. The brines tested were calcium bromide brine with a density of 14.2 ppg, calcium bromide/zinc bromide brine with a density of 16.5 ppg and calcium bromide/zinc bromide brine with a density of 19.2 ppg. Cationic guars tested were Jaguar CP-14 and Jaguar C-17 both available Rhodia Inc., Cranbury, N.J. As a comparative example a non-ionic guar, Jaguar HP-96, also available from Rhodia Inc., Cranbury, N.J. was also tested for viscosifying ability. The guars were thoroughly dispersed into the brine by stirring with a Waring Blender for 2 minutes at 2500 rpm to prepare the well servicing fluid. As shown in Table 1, 0.1 to 0.3 ml of 25% acetic acid was added to the brine-polymer mixture. Viscosity for each brine-polymer mixture was tested with a Brookfield viscometer after the fluid mixture was aged at 25° C. from 1 hour to 96 hours and the results are shown in Tables 1, 2 and 3.

TABLE 1

Viscosities of Brines containing Calcium Bromide (52%) having a density of 14.2 ppg

| Aging Time (hr) | Viscosities of 0.5 wt % Jaguar HP-96 (cps) Contains 0.1 ml acetic acid in 200 g of brine | Viscosities of 4 wt % Jaguar CP-14 (low molecular weight) (cps) Contains 0.3 ml acetic acid in 200 g of brine | 0.5 wt % Jaguar C-17 Contains 0.1 ml acetic acid in 200 g of brine |
|---|---|---|---|
| 1 | 25 | 450 | 990 |
| 18 | 85 | 4600 | 1850 |
| 26 | 100 | | |
| 50 | 180 | | |

TABLE 2

Viscosities of Brines containing Calcium Bromide(35%)/Zinc Bromide(21%) having a density of 16.5 ppg

| Aging Time (hr) | Viscosities of 1% Jaguar HP-96 (cps) | Viscosities of 1% Jaguar C-17 (cps) |
|---|---|---|
| 2 | 35 | 20 |
| 20 | | 730 |
| 24 | 35 | |
| 28 | | 1200 |
| 36 | 35 | |
| 50 | 180 | |

TABLE 3

Viscosities of Brines containing Calcium Bromide(22.8%)/Zinc Bromide(52.8%) having a density of 19.2 ppg

| Aging Time (hr) | 4% Low Molecluar weight Jaguar CP-14 | 1% Jaguar C-17 | 4% Low Molecular weight Jaguar C-17 |
|---|---|---|---|
| 2 | 45 | 40 | 65 |
| 8 | 60 | 70 | 175 |
| 24 | 90 | 280 | 1150 |
| 96 | 230 | 600 | 3800 |

Jaguar HP-96: Non-ionic guar, Molecular Weight about 2,000,000
Low Molecular Weight Jaguar CP-14: Cationic guar, Molecular Weight, about 300,000
Jaguar C-17: Cationic guar, Molecular Weight about 2,000,000
Low Molecular Weight Jaguar C-17: Cationic guar, Molecular Weight about 300,000

Which is claimed is:

1. A process of preparing a well servicing fluid consisting essentially of:
   obtaining a cationic guar; and
   contacting the cationic guar with a brine having a density of at least 11.5 ppg, thereby viscosifying the brine.

2. A well servicing fluid composition prepared according to the process of claim 1 comprising a viscosified heavy brine comprising a zinc salt, a calcium salt, or mixtures thereof; and a cationic guar prepared from the reaction between guar gum and a reactive quaternary amine compound.

3. The composition of claim 2 wherein the cationic guar has a charge density of about 1.6 meq/g and a molecular weight from about 100,000 to about 2,000,000.

4. The process of claim 1, wherein the well serving fluid comprises a drilling fluid, workover fluid, fracturing fluid, recompletion fluid or a completion fluid.

5. The process of claim 1, wherein the brine has a density from about 11.5 ppg to about 19.5 ppg.

6. The process of claim 1, wherein the brine has density from about 14 ppg to about 19.5 ppg.

7. The process of claim 1, wherein the brine comprises a solution of at least one water soluble salt of a multivalent metal.

8. The process of claim 1, wherein the brine comprises a zinc salt selected from the group consisting of zinc chloride, zinc bromide, zinc iodide, zinc sulfate, and mixtures thereof.

9. The process of claim 1, wherein the brine comprises a calcium salt selected from the group consisting of calcium chloride, calcium bromide and calcium iodide, and mixtures thereof.

10. The process of claim 1, wherein the cationic guar is present in an amount from about 0.1 wt % to about 5 wt % based on the weight of the brine.

11. The process of claim 1, wherein the cationic guar is present in an amount from about 0.5 wt % to about 4 wt % based on the weight of the brine.

12. The process of claim 1, wherein the cationic guar has molecular weight from about 100,000 to about 2,000,000.

13. The process of claim 1, wherein the cationic guar has molecular weight from about 100,000 to about 1,000,000.

14. The process of claim 1, wherein the well servicing fluid comprising the brine has a viscosity from about 200 to about 15000 cps.

15. The process of claim 1, wherein the well serving fluid comprising the brine has a viscosity from about 200 to about 5000 cps.

16. The process of claim 1, wherein the cationic guar is a hydroxypropyl trimethylammonium chloride guar derivative.

17. The process of claim 1, wherein the cationic guar has a cationic charge density of about 1.6 meq/g.

18. A well servicing fluid composition prepared according to the process of claim 1 comprising a viscosified heavy brine comprising a calcium salt, a zinc salt, or mixtures thereof, and a cationic polysaccharide having a charge density of about 1.6 meq/g and a molecular weight from about 100,000 to about 2,000,000 prepared by the reaction of guar gum with quaternary ammonium compound.

\* \* \* \* \*